United States Patent [19]

Hollis

[11] Patent Number: 4,497,931

[45] Date of Patent: Feb. 5, 1985

[54] ANTIOXIDANTS AND LITHIUM ION

[75] Inventor: Samuel D. Hollis, Savannah, Ga.

[73] Assignee: Union Camp Corporation, Wayne, N.J.

[21] Appl. No.: 509,929

[22] Filed: Jul. 1, 1983

Related U.S. Application Data

[60] Division of Ser. No. 292,441, Aug. 14, 1981, abandoned, which is a continuation-in-part of Ser. No. 183,354, Sep. 2, 1980, Pat. No. 4,284,543.

[51] Int. Cl.³ .......................... C08K 3/22; C08K 3/26; C08K 5/09; C08K 3/10
[52] U.S. Cl. ..................................... 524/570; 524/394; 524/323; 524/401; 524/424; 524/585; 524/586; 524/606; 524/270; 524/274
[58] Field of Search ............... 524/586, 394, 570, 606, 524/401

[56] References Cited

U.S. PATENT DOCUMENTS

| | | | |
|---|---|---|---|
| 2,507,142 | 5/1950 | Chaban | 260/45.7 |
| 2,510,035 | 5/1950 | Mack | 524/396 |
| 3,405,072 | 10/1968 | Kinnavy | 252/400 |
| 3,492,229 | 1/1970 | Weiss | 252/25 |
| 3,519,571 | 7/1970 | Szczepanek et al. | 252/400 |
| 4,148,766 | 4/1979 | McClain | 524/396 |
| 4,150,003 | 4/1979 | McClain et al. | 524/396 |

Primary Examiner—Carman J. Seccuro
Attorney, Agent, or Firm—Kane, Dalsimer, Kane, Sullivan and Kurucz

[57] ABSTRACT

Antioxidants are enhanced in their activity by the presence of soluble lithium ion.

3 Claims, No Drawings

ANTIOXIDANTS AND LITHIUM ION

CROSS REFERENCE TO RELATED APPLICATION

This application is a divisional of my copending application Ser. No. 292,441, filed Aug. 14, 1981, now abandoned which application is a continuation-in-part of my copending application Ser. No. 183,354, filed Sept. 2, 1980, now U.S. Pat. No. 4,284,543.

BACKGROUND OF THE INVENTION

Field of the Invention

The invention relates to antioxidants and their use in slowing the rate of oxidation in auto-oxidizable materials.

Brief Description of the Prior Art

The autooxidation of organic compounds in liquid or solution states is said to be the result of a free radical chain reaction. Initiation of the reaction apparently requires the production of a free radical by direct oxygen attack, photochemical reaction or by the addition of an oxidizing agent. A number of compounds are known to inhibit the autooxidation by scavenging free radicals and interrupting the free radical reaction. These scavenger compounds are known commonly as antioxidants. Other antioxidants may function by forming a complex with a peroxy radical, which then reacts with another peroxy radical to yield termination products, interrupting the autooxidation.

Without being bound by any theory of operation, the present invention is based on my discovery that the inhibitory effect of an antioxidant on the autooxidation of an organic material is enhanced in the presence of soluble lithium ion.

SUMMARY OF THE INVENTION

The invention comprises a composition, which comprises an antioxidant and an ionic form of lithium, in admixture. The composition of the invention is useful to inhibit oxidation in liquid forms of organic materials which are ordinarily subject to autooxidation.

The invention also comprises the use of compositions of the invention to stabilize organic materials against oxidation.

DETAILED DESCRIPTION OF THE INVENTION

The compositions of the invention are antioxidants, having improved antioxidant activity over the base antioxidant ingredient. This is because the lithium ion acts as a promotor or booster of the antioxidant, enhancing its activity. The advantage is that in the presence of lithium ion, lower concentrations or proportions of the base antioxidant are required to stabilize a given organic material against oxidation. This is an economic advantage.

Any antioxidant compound is promoted or boosted in its antioxidant activity by the presence of lithium ion. Representative of such antioxidants are aldehyde-amines, ketone-amines, ketone-diarylamines, alkylated diphenylamines, phenylenediamines, phenolics, diphenolics, phenolic sulfides and the like.

A vast number of antioxidants are commerically available. This subject is well reviewed under the heading "Antioxidants and Antiozonants" by P. O. Nicholas, et al in Volume 3, Third Edition of the Kirk-Othmer Encyclopedia of Chemical Technology.

The phenolic type of antioxidant is particularly improved or enhanced in the presence of lithium ion.

Phenolic antioxidants are a well-known class of compounds as is the method of their preparation. Representative of this class of compound are the sterically hindered phenolic compounds such as those described in U.S. Pat. No. 3,873,466. More specifically representatives of this class of antioxidants are:
2,6-di-tert-butyl-p-cresol;
2,2'-methylenebis(6-tert-butyl-p-cresol);
1,5-naphthalenediol;
4,4'-thiobis(6-tert-butyl-m-cresol);
p,p-biphenol;
butylated hydroxy toluene;
4,4'-butylidenebis(6-tert-butyl-m-cresol);
4-methoxy-2,6-di-tert-butyl phenol;
and the like.

The compositions of the invention are prepared by mixing with the antioxidant, an antioxidizing enhancing proportion of an ionic form of lithium. The enhancing proportion of lithium form (compound) is generally within the range of from about 5 to about 80 percent by weight of the compositions of the invention. This range is a sufficient proportion to provide the equivalent of at least 0.01 percent by weight of lithium metal in the organic compounds stabilized with the compositions of the invention. Preferably the equivalent of 0.005 to 1.0 percent is so provided. The lithium compound may be in solid form for convenience and it may be added with mixing to the antioxidant, employing conventional methods and apparatus for mixing. In general, from about 0.1 to about 10 percent by weight of oxidizable organic material, of the compositions of the invention are employed to stabilize the organic material. Any lithium compound which will provide lithium ion is usable as an ingredient of the compositions of the invention. Representative of such compounds are lithium hydroxide, lithium stearate, lithium acetate, lithium carbonate, lithium salts of organic acids and the like.

Any class of antioxidant known to provide a degree of protection for a particular autooxidizable organic material will be markedly enhanced in respect to its antioxidant activity when lithium is mixed with it as described above. The level of the antioxidant used to stabilize a given material may be significantly reduced, to provide a level of protection previously established, but at lower cost. These are valuable advantages associated with the compositions of the invention.

A wide range of autooxidizable organic materials may be stabilized by the method of the invention, employing the compositions of the invention. Representative of such organic materials are fats and oils such as edible oils including animal and vegetable fats and oils; for example soyabean oil, rape seed oil, arachis oil and the like. Also representative of organic materials stabilized against autooxidation by the method and the compositions of the invention are soaps, rubber products, petroleum products, cosmetic preparations, pharmaceuticals, food polymeric resins and the like.

The method of the invention is particularly useful to stabilize polyolefins against autooxidation.

Polyolefins such as polyethylene, polypropylene, polyvinyl alcohol, and the like; copolymers thereof such as ethylene-vinyl acetate copolymers and the like are prone to self-crosslinking, promoted by oxidation in air. As cross-linking of the polyolefins progresses, particularly in softened, liquid or solvated states, gel formation occurs. The gels developed are undesirable, interfering with coating, extrusion, etc., of the polyolefin.

Prior to the present invention, antioxidants, including phenolic classes of antioxidants were added to polyolefins to retard the rate of oxidation; see for example "Antioxidants and Antiozonants" by P. O. Nicholas, et al supra.

One embodiment of the method of the invention comprises the addition of a compound which is a source of lithium ions, to a molten EVAc-based adhesive to provide lithium ions therein. Thus, for example, a typical hot-melt adhesive composition of petroleum wax, hydrocarbon tackifying resin and EVAc which has been observed to exhibit gel particle formation and viscosity increase during use may be improved by dusting into it a compound providing lithium ions. The proportion of compound dusted in may vary over a wide range. Advantageously, a sufficient proportion is used to provide the equivalent of at least 0.01 percent by weight of the adhesive composition of lithium metal. Preferably the equivalent of 0.005 to 1.0 percent is so provided. A larger proportion may be used, but serves no particular purpose. In this embodiment of the invention the lithium compound may be in powdered form for convenience and it may be added with mixing to an adhesive composition during melting or just after it has become molten rather than to a hot melt adhesive which may have been retained for some period of time in the molten state. In the latter instance, oxidative degradation has already been initiated and may be well advanced.

In a preferred embodiment of the invention the inclusion of a reactive form of lithium in the EVAc-based adhesive is accomplished by providing the lithium ion as a salt of rosin or a rosin derivative. More specifically, rosin such as tall oil rosin, gum rosin, wood rosin and the like rosins or ester derivatives thereof commonly used as tackifiers in EVAc-based adhesive compositions may be reacted with a reactive form of lithium compound so that the lithium ion becomes a chemically combined part of the rosin or its ester. This form of lithium is preferred for supplying the lithium ion in a preferred method of the invention.

Other polymeric resins which are advantageously stabilized against autooxidation are polyamides (including acid and amine terminated classes), polyesters, polyaramids, polyepoxy resins and the like.

The following examples describe the manner and process of making and using the invention and set forth the best mode contemplated by the inventor but are not to be construed as limiting. All parts are by weight unless otherwise indicated.

EXAMPLE 1

(A) A suitable reaction flask is charged with 90.2 parts of melted tall oil rosin (Unitol NCY, Union Camp Corp.), 5.8 parts ethylene glycol. The charge is heated to a temperature of circa 275° C. with stirring under a nitrogen gas atmosphere until condensation proceeds to an acid number of about 65–70. To the resulting molten mixture there is added 0.2 parts butylated hydroxy toluene and 4.0 parts of lithium hydroxide monohydrate. The resulting mixture is maintained at a temperature of 270° C. until the acid number is in a range of 10 to 15. Then the mixture is cast in pans and allowed to cool to room temperature. The resulting resin has a ring and ball softening point at 81° C., a lithium metal content of 0.7 percent and a color (rosin cube) of N.

(B) To 5 parts of the resin prepared in (A) above there is added a mixture of 40 parts of ethylene-vinyl acetate copolymer (Elvax 250, E. I. DuPont), 20 parts paraffin wad (RO-855, Moore & Monger, Inc.) and 35 parts hydrocarbon resin (Wingtac 95; Goodyear Tire and Rubber Co.). The paraffin wax and Wingtac 95 are melt blended together in a 6½ by 10 cm steel beaker, then heated to 350° F. at which temperature Elvax 250 is added in small increments until it is all dissolved and blended smooth.

A 50 g initial sample of the resulting composition is poured out onto a piece of release paper and the beaker placed in a forced draft oven maintained at a temperature of 350° F. This beaker is probed and evaluated every 24 hours for a period of 96 hours for the development of skins on the surface and gels in the body of the compound. After 96 hours the hot adhesive is used to pour out a final 50 g sample. These samples are examined to evaluate the initial and final viscosity, color change (Gardner color at 50% solids in hot toluene) and grainy appearance or other significant change from the initial sample. The results are shown in TABLE 1, below.

TABLE 1

| Skinning (surface coverage, %) | |
| --- | --- |
| 24 hrs. at 350° F. | 2 |
| 48 hrs. at 350° F. | 2 |
| 72 hrs. at 350° F. | 2 |
| 96 hrs. at 350° F. | 2 |
| Initial Color (Gardner) | 3 |
| Final Color (Gardner) | 14 |
| Initial Viscosity (cps at 350° F.) | 5375 |
| Final Viscosity | 3600 |
| Viscosity Change | −33% |
| Final condition of melt | Opaque liquid, free of gels |

When applied as a molten film or bead, the mixture strongly bonds paper to paper, paper to aluminum foil and aluminum foil to steel.

EXAMPLE 2

A suitable vessel is charged with 75 parts of melted 2,6-di-tert-butyl-p-cresol and 25 parts of lithium hydroxide monohydrate. The charge is thoroughly mixed. The resulting mixture is maintained at a temperature of 270° C. and added in a proportion of about 2.5 parts to 100 parts of molten polyethylene (average molecular weight circa 500,000). The mixture is allowed to cool to room temperature to obtain a stabilized polyethylene, useful as a hot-melt coating for paper products.

When tested by standard oxygen absorption, gel formation, viscosity change and surface embrittlement tests, the stabilized polyethylene is found to be the equivalent in a stability of a polyethylene stabilized with a 5 percent content of the 2,6-di-tert-butyl-p-cresol.

When applied as a molten film or bead, the mixture strongly bonds to paper.

EXAMPLE 3

A 70 percent solution of hydrogenated rosin in ethylene glycol is prepared and 0.5 percent (by weight of rosin) of lithium hydroxide monohydrate is added with stirring. The mixture is heated to a temperature of 285° C. while distilling off a mixture of glycol/water. Additional glycol is added to bring the final acid number down to a range of from 12 to 18, and the mixture is sparged for 1 hour with nitrogen gas, then poured into pans at 180° C. and allowed to cool. The product is a lithium rosin resin useful to enhance antioxidants.

EXAMPLE 4

Procedure. Snowdrift vegetable shortening was weighted out in clean 250 ml tall form beakers, (labelled A-D) melted and mixed with a stabilizing additive. Various proportions of a lithium compound providing lithium ion were then added with mixing. All beakers were heated to 210° C. (410° F.) in ½ hour, then placed in a forced draft oven at 170° C. (338° F.) for four hours and analyzed for acid number and peroxide value 16 hours after the heat exposure using AOCS methods Col. 3a-63 and Col. 8-53 respectively. The proportions of antioxidant, lithium ion and results are shown below in TABLE I.

TABLE I

|  | A | B | C | D |
|---|---|---|---|---|
| Vegetable shortening | 150 | 150 | 150 | 150 |
| Stabilizers |  |  |  |  |
| butylatedhydroxy toluene | 1.5 | 1.5 | 1.5 | 1.5 |
| Witco No. 306* | None | 1.5 | 0.75 | 0.15 |
| RESULTS |  |  |  |  |
| Lithium metal content (%) | None | 0.02 | 0.01 | 0.002 |
| Acid No | 0.7 | 0.9 | 1.0 | 0.8 |
| Peroxide value meq./Kg | 0.42 | 0.0 | 0.0 | 0.0 |

*Witco Chemical Corp. Lithium Stearate contains 2.5% Li metal

EXAMPLE 5

The procedure of Example 4, supra., is repeated a number of times, except that the vegetable shortening as used therein was replaced with a number of polyamide resins (Uni-Rez, Union Camp Corp.) containing as an antioxidant 1.5 percent of Vanlube-81 (R. T. Vanderbilt) in Uni-Rez 2624 and 0.2-1.0 percent of Irganox-1010 (Ciba) in Uni-Rez 2625. Heating was carried out for 17 hours at a temperature of 190° C. The results are given in TABLE II, below.

TABLE II

| Experiment | 1 | 2 | 3 | 4 | 5 | 6 | 7 | 8 | 9 | 10 |
|---|---|---|---|---|---|---|---|---|---|---|
| Uni-Rez 2624 | 150 | 150 | 150 | 150 |  |  |  |  |  |  |
| Uni-Rez 2625 | — | — | — | — | 150 | 150 | 150 | 150 |  |  |
| Witco No. 306 | None | 4.8 | None | — | None | 4.8 | None | None |  |  |
| Lithium Resin 301-58* | None | None | None | 6 | None | None | None | 6 |  |  |
| RESULTS |  |  |  |  |  |  |  |  |  |  |
| Lithium metal (%) | 0 | 0.08 | 0 | 0.02 | 0 | 0.08 | 0 | 0.02 |  |  |
| Initial viscosity cps at 190° C. | 8400 |  | 8400 | 7600 | 12000 |  | 12000 | 14600 |  |  |
| Final viscosity cps at 190° C. | 7200 | 2475 | 6000 | 6775 | 25750 | 15200 | 18150 | 12450 |  |  |
| Viscosity change (%) | −14 | −71 | −30 | −11 | +114 | +27 | +51 | −15 |  |  |
| Polymer Termination | acid | acid | acid | acid | amine | amine | amine | amine |  |  |

*Lithium modified ethylene glycol ester of hydrogenated rosin - contains ½% Li, from Example 3, supra.

EXAMPLE 6

The general procedure of Example 4, supra., is repeated except that the shortening as used therein is replaced with a polyester. The materials used and the results are shown in TABLE III, below.

TABLE III

|  | Uniflex 315 | Uniflex* 315 |
|---|---|---|
| Witco No. 306 | None | 4.8 |
| Butylated hydroxy toluene | 0.5 | 0.5 |
| Butylated bisphenol A | 0.5 | 0.5 |
| Initial viscosity (cps) | 5,415 at 25° C. | 5,415 at 25° C. |
| Final viscosity | 6,200 at 25° C. | 5,415 at 25° C. |
| Viscosity change (%) | +14 | 0 |

*An alcohol terminated, adipic base-saturated polyester.

EXAMPLE 7

The general procedure of Example 4, supra., is repeated except that the shortening as used therein is replaced with a polyethylene resin and heating is carried out for 24 hours at a temperature of 140° C. The materials used and the results are shown in TABLE IV, below.

TABLE IV

| Experiment | 1 | 2 | 3 | 4 |
|---|---|---|---|---|
| BHT | — | 0.4 | 0.4 | 0.4 |
| Butylated bisphenol A | — | 0.4 | 0.4 | 0.4 |
| Polyethylene AC-8* | 160 | 160 | 160 | 160 |
| Witco No. 306 | — | — | 1.2 | — |
| Li-Rosin ester, Example 3, supra. | — | — | — | 2.0 |
| RESULTS |  |  |  |  |
| Li metal content (%) | None | None | 0.02 | 0.006 |
| Initial viscosity cps at 140° C. | 442 | 432 | 472 | 450 |
| Final viscosity cps at 140° C. | 451 | 441 | 440 | 452 |
| Viscosity change (%) | +2% | +2% | −7% | +0.4% |

*Supplied by Allied Chemical Corp.

Those skilled in the art will appreciate that many modifications may be made to the above-described preferred embodiments of the invention without departing from the spirit and the scope of the invention. For example, although the compositions of the invention have been shown pre-formed and added to a polyolefin to stabilize said polyolefin, they may be prepared in-situ.

What is claimed:

1. A method of stabilizing an autooxidizable organic polymer selected from the group consisting of a polyolefin and a polyamide, which comprises; incorporating in the polymer a stabilizing proportion of a composition which consists essentially of an antioxidant and an ionic form of lithium, by forming a molten admixture of said polymer, antioxidant and ionic form of lithium.

2. The method of claim 1 wherein the polymer is a polyolefin.

3. The method of claim 1 wherein the polymer is a polyamide.

* * * * *